United States Patent
Hugel et al.

(10) Patent No.: US 10,067,023 B2
(45) Date of Patent: Sep. 4, 2018

(54) DIFFERENTIAL PRESSURE MEASURING PICKUP

(71) Applicant: Endress + Hauser GmbH + Co. KG, Maulburg (DE)

(72) Inventors: Michael Hugel, Lorrach (DE); Thomas Uehlin, Schopfheim (DE); Christian Hahn, Steinen (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 196 days.

(21) Appl. No.: 15/120,604

(22) PCT Filed: Jan. 16, 2015

(86) PCT No.: PCT/EP2015/080787
§ 371 (c)(1),
(2) Date: Aug. 22, 2016

(87) PCT Pub. No.: WO2015/128111
PCT Pub. Date: Sep. 3, 2015

(65) Prior Publication Data
US 2017/0010169 A1   Jan. 12, 2017

(30) Foreign Application Priority Data
Feb. 28, 2014   (DE) .................. 10 2014 102 719

(51) Int. Cl.
*G01L 9/00* (2006.01)
*G01L 13/02* (2006.01)
(Continued)

(52) U.S. Cl.
CPC .......... *G01L 13/026* (2013.01); *G01L 9/0048* (2013.01); *G01L 9/025* (2013.01);
(Continued)

(58) Field of Classification Search
CPC .......... G01L 9/00; G01L 9/0048; G01L 9/025; G01L 13/02; G01L 13/026; G01L 19/00;
(Continued)

(56) References Cited

U.S. PATENT DOCUMENTS

| 4,163,395 | A | 8/1979 | Medlar |
| 4,176,557 | A | 12/1979 | Johnston |

(Continued)

FOREIGN PATENT DOCUMENTS

| DE | 2718873 A1 | 11/1977 |
| DE | 10162044 A1 | 6/2003 |

(Continued)

OTHER PUBLICATIONS

German Search Report, German Patent Office, Munich, DE, dated Mar. 24, 2014.

(Continued)

*Primary Examiner* — Nguyen Ha
(74) *Attorney, Agent, or Firm* — Bacon & Thomas, PLLC

(57) ABSTRACT

A differential pressure measuring pickup comprises a measuring pickup body and a differential pressure sensor. The measuring pickup body has a process interfacing surface with a first pressure input opening and a second pressure input opening. The differential pressure sensor can be loaded with a first pressure through the first pressure input opening and with a second pressure through the second pressure input opening. The first pressure input opening is closed by way of a first separating diaphragm and the second pressure input opening is closed by way of a second separating diaphragm. The first separating diaphragm is sealed with respect to the surroundings by way of a first seal, and wherein the second separating diaphragm is sealed with respect to the surroundings by way of a second seal. The differential pressure measuring pickup is tensioned during (Continued)

measuring operation with the process interfacing surface thereof against a process interfacing flange, wherein at least one plate-shaped spacer element with plane-parallel surfaces is clamped in between the process interfacing flange and the process interfacing surface, which spacer element defines the spacing between the process interfacing surface and the process interfacing flange and limits clamping of the seals between the process interfacing surface and the process interfacing flange.

13 Claims, 2 Drawing Sheets

(51) Int. Cl.
   *G01L 19/00* (2006.01)
   *G01L 19/06* (2006.01)
   *G01L 19/14* (2006.01)
   *G01L 9/02* (2006.01)

(52) U.S. Cl.
   CPC ........ *G01L 19/003* (2013.01); *G01L 19/0046* (2013.01); *G01L 19/0672* (2013.01)

(58) Field of Classification Search
   CPC ... G01L 19/003; G01L 19/0046; G01L 19/06; G01L 19/0672; G01L 19/14
   See application file for complete search history.

(56) References Cited

U.S. PATENT DOCUMENTS

| | | | |
|---|---|---|---|
| 5,535,629 A * | 7/1996 | Gerdes | G01L 9/0075 73/715 |
| 5,955,675 A | 9/1999 | Peterson | |
| 6,076,409 A | 6/2000 | Bang | |
| 6,122,973 A * | 9/2000 | Nomura | G01L 9/0075 361/283.4 |
| 6,389,903 B1 | 5/2002 | Oba | |
| 2015/0308575 A1 | 10/2015 | Hugel | |
| 2015/0377733 A1* | 12/2015 | Thompson | G01L 19/0645 73/706 |

FOREIGN PATENT DOCUMENTS

| | | |
|---|---|---|
| DE | 102006057828 A1 | 6/2008 |
| DE | 102012102834 A1 | 9/2013 |
| DE | 102012103688 A1 | 10/2013 |
| WO | 8807185 A1 | 9/1988 |
| WO | 2013160077 A1 | 10/2013 |

OTHER PUBLICATIONS

International Search Report, EPO, The Netherlands, dated May 19, 2015.
English Translation of the International Preliminary Report on Patentability, WIPO, Geneva, CH, dated Sep. 15, 2016.

* cited by examiner

DIFFERENTIAL PRESSURE MEASURING PICKUP

TECHNICAL FIELD

The present invention relates to a differential pressure measuring pickup, which comprises a measuring pickup body and a differential pressure sensor, which is arranged in the measuring pickup body, wherein the measuring pickup body has a process interfacing surface with a first pressure input opening and a second pressure input opening, wherein the differential pressure sensor can be loaded with a first pressure through the first pressure input opening and with a second pressure through the second pressure input opening, wherein the first pressure input opening is closed by way of a first separating diaphragm, wherein the second pressure input opening is closed by way of a second separating diaphragm, wherein the first separating diaphragm is sealed with respect to the surroundings by way of a first seal, and wherein the second separating diaphragm is sealed with respect to the surroundings by way of a second seal.

BACKGROUND DISCUSSION

Generic differential pressure measuring pickups are described, for example, in the patents U.S. Pat. No. 5,955,675, U.S. Pat. No. 5,922,965, U.S. Pat. No. 6,055,863, and U.S. Pat. No. 7,080,558.

In the differential pressure measuring pickups according to the patents mentioned, the seals used are, in particular, metallic sealing rings, which, like the pressure input openings and the separating diaphragms, are arranged in recesses in the process interfacing surface, wherein the depth of the recesses determines the compression of the sealing rings, if it is assumed that the process interfacing surface of the differential pressure measuring pickup is tensioned during operation against a complementary mating surface of a flange.

In this way, the surface pressure of the sealing rings, which, on the one hand, must be high enough that the seal can withstand a media pressure and, on the other hand, must be as low as possible, so that the measurement characteristics of the differential pressure measuring pickup are not impaired, is essentially defined by the depth of the recesses in the process interfacing surface.

SUMMARY OF THE INVENTION

The preparation of the recesses is carried out, in particular, by machining the measuring pickup body, which, with the required precision, is very cost-intensive, wherein, in particular, asymmetries between the two recesses must be avoided. The task of the present invention is, therefore, to find a remedy.

The aim is achieved according to the invention by the differential pressure measuring pickup, which comprises a measuring pickup body and a differential pressure sensor, which is arranged in the measuring pickup body, wherein the measuring pickup body has a process interfacing surface with a first pressure input opening and a second pressure input opening. The differential pressure sensor can be loaded with a first pressure through the first pressure input opening and with a second pressure through the second pressure input opening, wherein the first pressure input opening is closed by way of a first separating diaphragm, and the second pressure input opening is closed by way of a second separating diaphragm. The first separating diaphragm is sealed with respect to the surroundings by way of a first seal, and the second separating diaphragm is sealed with respect to the surroundings by way of a second seal, wherein the differential pressure measuring pickup is tensioned during measuring operation with the process interfacing surface thereof against a process interfacing flange, characterized in that at least one plate-shaped spacer element with plane-parallel surfaces is clamped in between the process interfacing flange and the process interfacing surface, which spacer element defines the spacing between the process interfacing surface and the process interfacing flange and limits clamping of the seals between the process interfacing surface and the process interfacing flange.

By way of the plate-shaped spacer element, the degree of compression, and thus the surface pressure of the seals, is defined through the defined spacing and the axial thickness of the first and second seals in the inoperative state.

With the differential pressure measuring pickup according to the invention, a defined and symmetrical surface pressure of the seals can be realized more precisely and easily, since the production of a spacer element from a plate-shaped material with plane-parallel surfaces is easier to realize than the preparation of recesses by machining the measuring pickup body.

In a further development of the invention, the plate-shaped spacer element comprises at least a first continuous through-opening, which forms a first seal receptacle and which is positioned to be aligned with the first separating diaphragm. Preferably, the plate-shaped spacer element comprises two continuous through-openings, which respectively form a seal receptacle and which are respectively positioned to be aligned with one of the measuring diaphragms.

In a further development of the invention, the separating diaphragms are respectively joined to the measuring pickup body along a circumferential joint in the edge region of the separating diaphragm, which respectively surrounds one of the pressure input openings, wherein the seals respectively rest on the edge region of a separating diaphragm in order to protect the joint against a process medium that is present at the separating diaphragm.

In a further development of the invention, the seals comprise a metallic ring body, which comprises at least a first sealing surface facing the process interfacing surface and at least a second sealing surface facing away from the process interfacing surface, wherein the axial spacing between the first and the second sealing surface is at least proportionally elastically reduced to the spacing defined by the spacer element by clamping the seals between the process interfacing surface and the process interfacing flange.

In a further development of the invention, the ring bodies comprise a non-metallic—in particular, thermoplastic—coating at least in the region of one of the sealing surfaces.

In a further development of the invention, the thermoplastic coating with PTFE, PFA comprises a different fluoropolymer or an organic material, which contains one of the fluoropolymers mentioned.

In a further development of the invention, the spacer element has a spacing between the plane-parallel surfaces that is no more than 5 mm—in particular, no more than 2.5 mm, preferably no more than 1.5 mm, and particularly preferably no more than 1.0 mm.

In a further development of the invention, the through-openings in the spacer element have a diameter that is no more than 40 mm—in particular, no more than 30 mm, and preferably no more than 25 mm.

In a further development of the invention, the metallic ring bodies are designed as weld rings, which are welded to one separating diaphragm each and to the measuring pickup body.

In a further development of the invention, the seals are fixed using press fits in the through-openings of the spacer element or positioned in a loose fit in the through-openings.

In a further development of the invention, the spacer element comprises through-openings, which are aligned with the separating diaphragms, wherein respectively one edge region, surrounding the through-openings, of the spacer element is plastically deformed, in order to form axially elastically deformable sealing surfaces, which are clamped using a defined surface pressure by clamping the spacer element between the process interfacing surface and a process interfacing flange.

In a further development of the invention, the spacer element comprises a non-metallic—in particular, thermoplastic—coating at least in the region of the elastically deformable sealing surfaces.

In a further development of the invention, the thermoplastic coating with PTFE, PFA comprises a different fluoropolymer or an organic material, which contains one of the fluoropolymers mentioned.

BRIEF DESCRIPTION OF THE DRAWINGS

The invention will now be explained in further detail on the basis of the exemplary embodiments illustrated in the figures. Shown are:

FIG. 1b: is a top view of the exemplary embodiment of a differential pressure measuring pickup according to the invention from FIG. 1a;

DETAILED DISCUSSION IN CONJUNCTION WITH THE DRAWINGS

Figure 1A:
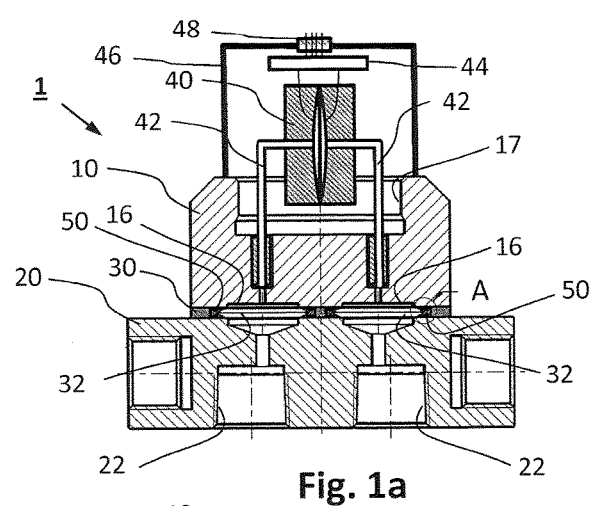
FIG. 1a: is a longitudinal section through an exemplary embodiment of a differential pressure measuring pickup according to the invention.
Figure 1B:
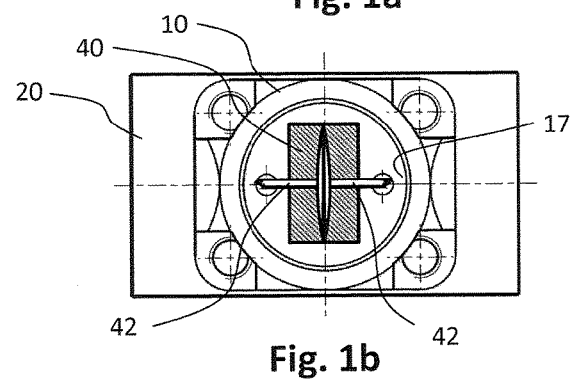
Figure 2:
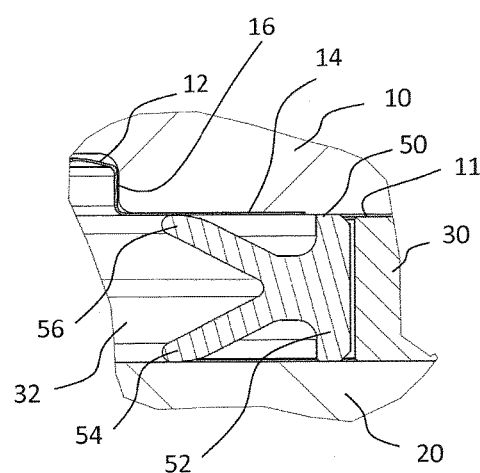
FIG. 2: is a detailed view of a clamped sealing ring of the exemplary embodiment of a differential pressure measuring pickup according to the invention from FIGS. 1a and 1b.
Figure 4:
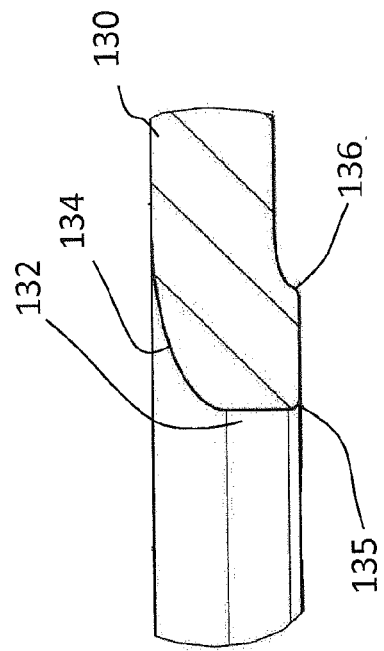
FIG. 4: is a detailed view of the spacer element from FIG. 3 in longitudinal section.

The differential pressure measuring pickup 1 shown in FIGS. 1a, 1b, and 2 comprises a measuring pickup body 10, which is mounted on a process interfacing flange 20, wherein a spacer element 30 is clamped between the process interfacing flange 20 and the measuring pickup body 10, which spacer element is dimensioned such that sealing rings, which are positioned in through-openings 32 of the spacer element 30, have a defined surface pressure.

The measuring pickup body 10 comprises a sensor chamber 17, in which a differential pressure sensor 40 is arranged, wherein the differential pressure sensor 40 can be loaded by means of 2 capillary lines 42, by which the differential pressure sensor is retained, with a first pressure and a second pressure, whose difference the differential pressure sensor is to measure. The first and the second pressure are delivered to the differential pressure measuring pickup 1 through bores 22, which extend through the process interfacing flange 20, and through-openings 32 in the spacer element 30, wherein the capillary lines 42 respectively communicate with one pressure input opening, which extends from recesses 16 in a flat front-side process interfacing surface 11 of the measuring pickup body 10 into the interior of the measuring pickup body 10. The pressure input openings are respectively closed with a flexible metallic separating diaphragm 16, wherein the metallic separating diaphragms 16 are respectively joined in a pressure-tight manner in their edge region 14, which is arranged on the flat process interfacing surface 11, along a circumferential joint to the measuring pickup body 10.

The differential pressure sensor 40 comprises a transducer with a capacitive differential capacitor, which is connected to an on-site electronic component 44, which drives the transducer, determines the capacities of the differential capacitor and provides a digital measured value that depends upon the differential pressure. The differential pressure sensor 40 and the on-site electronic component 44 are protected against the surroundings by means of a pressure-tight metallic housing segment 46, which is welded to the measuring pickup body 10, wherein the housing segment comprises a pressure-tight glass feed-through, through which the on-site electronic component 44 is connected to a superordinate circuit—that of a measuring transducer, for example.

FIG. 2 shows the details of detail A from FIG. 1a. In the two through-openings 32 of the spacer element 30, which comprises an essentially plane-parallel plate, a sealing ring 50 is respectively arranged, which comprises an essentially dimensionally rigid base body 52, from which a first spring leg 54 and a second spring leg 56 extend radially inwards, so that the cross section of the sealing ring is approximately the shape of a K. The sealing ring 50 comprises a metallic core, which is coated with a non-metallic coating (not here shown). The axial dimension of the sealing ring is, for example, approximately 1 mm, wherein the thickness of the non-metallic coating is, for example, approximately 50 μm to approximately 200 μm. In particular, fluoropolymers such as PTFE or PFA, or composite materials with such fluoropolymers, are worth considering as material for the non-metallic coating. The material thickness of the spacer element 30 is also approximately 1 mm, wherein the spacer element 30 defines the spacing between the process interfacing surface 11 of the measuring pickup body 10 and the process interfacing flange 20—and thus the end position of the two spring legs 54, 56. From the axial spacing of the two spring legs 54, 56 in a non-clamped inoperative state of the sealing ring 50, the degree of compression or the surface pressure between the sealing surfaces respectively adjacent to the sealing partners of the spring legs 54, 56 thus results. The spring legs are preferably dimensioned such that the surface pressure does indeed result in a compression of the non-metallic coating, but not in its breaking. For example, a PFA layer may be compressed by the axial compression of the spring legs from its initial thickness of 200 μm to approximately 100 μm. The axial elasticity of the spring legs ensures a sufficiently constant surface pressure, wherein the significant thermal expansion differences between the non-metallic coating and the metallic components can also be compensated for.

The sealing ring 50 thus seals the surroundings of the differential pressure measuring pickup 1 against a pressure path, which extends through the through-opening 32 in the spacer element 30 to the separating diaphragm 16. To the extent that the second spring leg 56 rests on the edge region 14 of the separating diaphragm 16, the joint between the separating diaphragm 16 and the measuring pickup body 10, which runs radially outside the sealing surface between the second spring leg and the separating diaphragm, is also protected against contact with a medium arising in the pressure path.

FIGS. 3 to 6 show exemplary embodiments of spacer elements, wherein seals are respectively integrated around the through-openings in the spacer elements. The spacer elements comprise, in particular, a metallic material and are, at least in the region of the seals—in particular, also over their entire surface—provided with a non-metallic coating, which comprises, for example, a thermoplastic material—in particular, a fluoropolymer, such as PTFE or PFA. The material thickness of this coating is, for example, not less than 50 μm and, in particular, not more than 200 μm.

Figure 3:
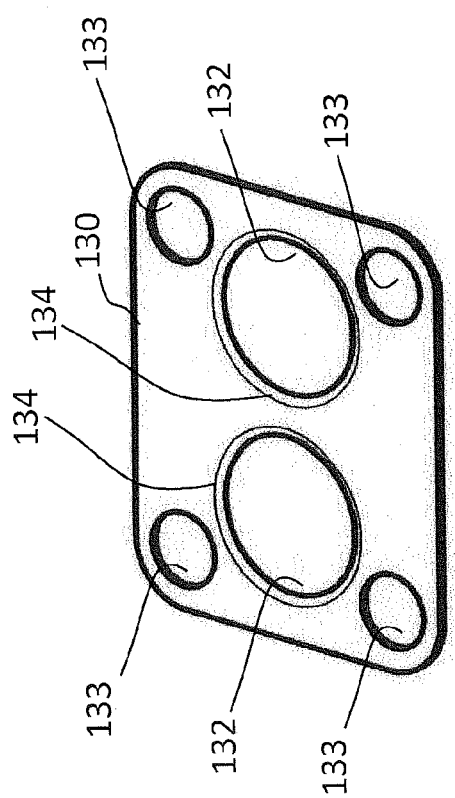
FIG. 3: is a spatial representation of a second exemplary embodiment of a spacer element of a differential pressure measuring pickup according to the invention.

The spacer element 130 shown in FIG. 3 has the same basic structure as the spacer element according to the first exemplary embodiment, i.e., it comprises two through-openings 132, through which pressure paths extend in the installed state of the spacer element. It further comprises four bolt holes 133, through which bolts are to be guided, with which the differential pressure measuring pickup is mounted to the process interfacing flange. In contrast to the first exemplary embodiment, in this and the following exemplary embodiments of the spacer element, seals are integrated into the spacer element. Here, as shown in detail in FIG. 4, an edge region 134 around the through-openings 132 is, by plastic deformation with respect to the plane-parallel surfaces of the spacer element 130, respectively brought into a new, axially shifted equilibrium position, from which it can be elastically moved by clamping the spacer element between a process interfacing, surface and a process interfacing flange. The plastic deformation of the edge region may take place as in the preparation of a pull-through in sheet metal—for example, as in the production of threads in sheet metal. After the preparation of the pull-through, flat sealing surfaces must of course be prepared, such as by sanding. Subsequently, at least the sealing surfaces—in particular, however, the entire surfaces of the spacer element—must be coated with the non-metallic material.

IM, a surface section between an inside radius 135 and an outside radius 136 of the axially protruding edge region, has the effect of a first sealing surface—that, for example, at the edge region of the separating diaphragm. A surface region opposite the outside radius 136 on the other side of the spacer element is used as a second sealing surface adjacent to the process interfacing flange, for example.

Figure 5:
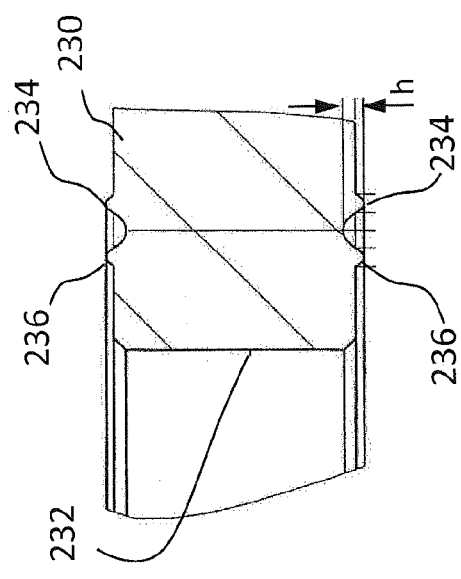
FIG. 5: is a detailed view of a third exemplary embodiment of a spacer element of a differential pressure measuring pickup according to the invention in longitudinal section.

The exemplary embodiment shown in FIG. 5 of a spacer element 230 comprises two through-openings 232, wherein annular circumferential ribs 234, 236 that are concentric with respect to the through-opening 232 are formed on both sides of the spacer element around the through-openings 232 by plastic deformation, wherein the height h of the circumferential ribs 234, 236 is higher with respect to a trench between the two ribs than the height of the ribs with respect to the plane-parallel surfaces of the spacer element. In the region of the ribs 232, 234, the spacer element 230 has the highest surface pressures when it is clamped between a process interfacing surface and a process interfacing flange. The ribs 232, 234 on one side of the spacer element 230 rest as intended on the edge region of a separating diaphragm, wherein preferably two ribs have a smaller radius than the radius of a circumferential joint, with which the separating diaphragm is attached to the process interfacing surface of the differential pressure measuring pickup. The contours of the ribs are, in particular, produced by embossing methods prior to the through-openings being introduced into the spacer elements.

Figure 6:
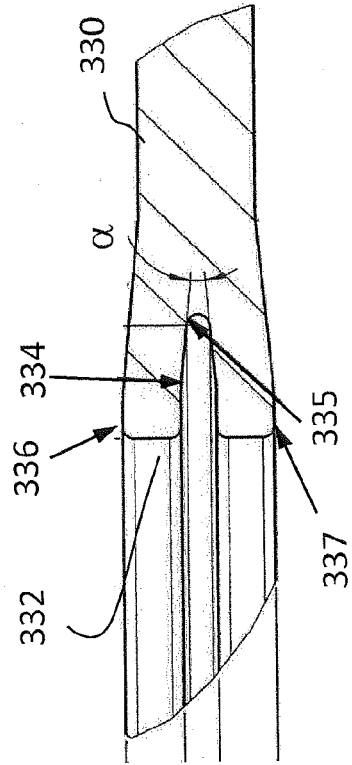
FIG. 6: is a detailed view of a third exemplary embodiment of a spacer element of a differential pressure measuring pickup according to the invention in longitudinal section.

The exemplary embodiment shown in FIG. 6 of a spacer element 330 comprises 2 through-openings 332, wherein an edge region surrounding the pressure openings respectively comprises, at the height of half the material thickness of the spacer element, a circumferential annular groove 334, which is formed between a first spring ring 336 in a second spring ring 337, wherein the spring rings have an opening angle toward each other, which is no more than 60°—in particular, no more than 45°, and preferably no more than 30°. By clamping the spacer element 330 between a process interfacing flange and a process interfacing surface of a differential pressure measuring pickup, the spring rings 336, 337 are axially compressed, so that their outside surfaces act as sealing surfaces against the process interfacing flange and the process interfacing surface respectively.

The spacer element 330 can, for example, be manufactured in such a way that, initially, a spring ring is formed on plates with half the thickness of the spacer element by plastic deformation of the edge region in the shape of a pull-through around a through-opening 232, wherein 2 such plates are subsequently joined to one another. In this respect, it must be ensured that a reliable joint, such as by means of a circumferential weld seam prepared by resistance welding, is present between the plates at the outside radius 335 of the annular groove 334, which is formed between the two annular springs 336, 337, whereby, preferably, a radius of curvature is defined, which does not fall below a minimum value, in order to limit notch stresses between the annular springs.

Similarly, a circumferential gap can be cut into the wall of a through-opening in a sheet of the full thickness of the spacer element by means of a high-speed diamond saw foil and subsequently flared using a hard metal disk or something similar.

As already mentioned above, the spacer element 330 is also coated with a non-metallic material, wherein the coating comprises, in particular, a fluoropolymer, wherein the coating in the region of the annular groove 334, in particular, is used to protect the joint between the two plates on the outside radius 335 of the annular groove 334 against corrosion.

The invention claimed is:

1. A differential pressure pickup, comprising:
    a measuring pickup body;
    a differential pressure sensor, which is arranged in said measuring pickup body;
    a process interfacing surface; and
    at least one plate-shaped spacer element with plane-parallel surfaces, wherein:
    said measuring pickup body comprises said process interfacing surface with a first pressure input opening and a second pressure input opening;
    said differential pressure sensor can be loaded with a first pressure through said first pressure input opening and with a second pressure through said second pressure input opening;
    said first pressure input opening is closed by way of a first separating diaphragm, and said second pressure input opening is closed by way of a second separating diaphragm;

said first separating diaphragm is sealed with respect to the surroundings by way of a first seal;

said second separating diaphragm is sealed with respect to the surroundings by way of a second seal;

the differential pressure pickup is tensioned during measuring operation with said process interfacing surface thereof against a process interfacing flange;

said plate-shaped spacer element is clamped in between said process interfacing surface and said process interfacing flange, said spacer element defines a spacing between said process interfacing surface and said process interfacing flange and limits clamping of said seals between said process interfacing surface and said process interfacing flange.

2. The differential pressure measuring pickup according to claim 1, wherein:

said plate-shaped spacer element comprises at least a first continuous through-opening, which forms a first seal receptacle and which is positioned to be aligned with said first separating diaphragm; and said spacer element preferably comprises two continuous through-openings, which respectively form a seal receptacle and which are respectively positioned to be aligned with one of said separating diaphragms.

3. The differential pressure measuring pickup according to claim 2, wherein:

said seals are fixed using press fits in the through-openings of said spacer element or positioned in a loose fit in the through-openings.

4. The differential pressure measuring pickup according to claim 1, wherein:

said separating diaphragms are respectively joined to said measuring pickup body along a circumferential joint in the edge region of said separating diaphragm, which respectively surrounds one of said pressure input openings; and said spacer element respectively rests on the edge region of said separating diaphragm in order to protect the joint against a process medium that is present at said separating diaphragm.

5. The differential pressure measuring pickup according to claim 1, wherein:

said seals respectively comprise a metallic ring body, which comprises at least a first sealing surface facing the process interfacing surface and at least a second sealing surface facing away from the process interfacing surface; and the axial spacing between the first and the second sealing surface is at least proportionally elastically reduced to the spacing defined by the spacer element by clamping the seals between said process interfacing surface and said process interfacing flange.

6. The differential pressure measuring pickup according to claim 5, wherein:

said metallic ring bodies are designed as weld rings, which are welded to one separating diaphragm respectively and to the measuring pickup body.

7. The differential pressure measuring pickup according to claim 5, wherein:

said ring bodies comprise a non-metallic—in particular, thermoplastic—coating at least in a region of one of the sealing surfaces.

8. The differential pressure measuring pickup according to claim 7, wherein:

said thermoplastic coating comprises a fluoropolymer or an organic material, which contains one of fluoropolymers PTFE and PFA.

9. The differential pressure measuring pickup according to claim 1, wherein:

said spacer element has a spacing between its plane-parallel surfaces and is not thicker than 5 mm—in particular, not thicker than 2.5 mm, preferably not thicker than 1.5 mm, and particularly preferably not thicker than 1.0 mm.

10. The differential pressure measuring pickup according to claim 1, wherein:

the through-openings in the spacer element have a diameter that is no more than 40 mm—in particular, no more than 30 mm, and preferably no more than 25 mm.

11. The differential pressure measuring pickup according to claim 1, wherein:

said spacer element comprises through-openings that are aligned with the separating diaphragms, wherein respectively one edge region, surrounding the through-openings, of said spacer element is plastically deformed, in order to form axially elastically movable sealing surfaces, which are clamped using a defined surface pressure by clamping the spacer element between said process interfacing surface and a process interfacing flange.

12. The differential pressure measuring pickup according to claim 11, wherein:

said spacer element comprises a non-metallic—in particular, thermoplastic—coating at least in the region of the elastically movable sealing surfaces.

13. The differential pressure measuring pickup according to claim 12, wherein:

the thermoplastic coating comprises a fluoropolymer or an organic material, which contains one of fluoropolymers PTFE and PFA.

* * * * *